(12) United States Patent
Couch et al.

(10) Patent No.: US 7,048,782 B1
(45) Date of Patent: May 23, 2006

(54) APPARATUS AND PROCESS FOR POWER RECOVERY

(75) Inventors: Keith A. Couch, Arlington Heights, IL (US); Leonard E. Bell, Streamwood, IL (US); Richard A. Johnson, II, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 77 days.

(21) Appl. No.: 10/719,782

(22) Filed: Nov. 21, 2003

(51) Int. Cl.
*B01D 45/12* (2006.01)
*F02C 7/00* (2006.01)

(52) U.S. Cl. ............................ 95/269; 55/347; 55/348; 60/648; 60/783; 422/147; 422/187

(58) Field of Classification Search .............. 55/385.1, 55/347, 348, 349; 95/267, 269; 422/147, 422/187; 60/783, 784, 648, 39.25, 348
See application file for complete search history.

(56) References Cited

U.S. PATENT DOCUMENTS

| | | | | |
|---|---|---|---|---|
| 2,941,621 A | * | 6/1960 | Dygert et al. | 55/321 |
| 4,257,788 A | * | 3/1981 | Nassir | 55/346 |
| 4,279,624 A | * | 7/1981 | Wilson | 95/269 |
| 5,690,709 A | | 11/1997 | Barnes | 55/348 |
| 5,779,746 A | | 7/1998 | Buchanan et al. | 55/452 |
| 5,960,624 A | * | 10/1999 | Blotenberg | 60/783 |
| 6,137,022 A | | 10/2000 | Kuechler et al. | 585/638 |

FOREIGN PATENT DOCUMENTS

| GB | 2 077 631 A | 12/1981 |
|---|---|---|
| JP | 08159415 A * | 6/1996 |

* cited by examiner

*Primary Examiner*—Robert A. Hopkins
(74) *Attorney, Agent, or Firm*—John G. Tolomei; James C. Paschall

(57) ABSTRACT

Disclosed is a third stage separator which includes two main clean gas outlets. One main clean gas outlet communicates with a power recovery unit such as an expander turbine while the second main clean gas outlet communicates with a conduit that bypasses the expander turbine. The present invention avoids use of the extra equipment, engineering and installation labor required to prevent the bypass conduit from placing a force load on the line to the power recovery unit.

19 Claims, 3 Drawing Sheets

APPARATUS AND PROCESS FOR POWER RECOVERY

FIELD OF THE INVENTION

The present invention relates to a novel arrangement for recovering power from a gas stream laden with solids. Specifically, the present invention relates to a third stage separator (TSS) vessel for removing catalyst fines from hot regenerator flue gas of a fluid catalytic cracking (FCC) unit followed by a power recovery unit.

BACKGROUND OF THE INVENTION

FCC technology, now more than 50 years old, has undergone continuous improvement and remains the predominant source of gasoline production in many refineries. This gasoline, as well as lighter products, is formed as the result of cracking heavier (i.e. higher molecular weight), less valuable hydrocarbon feed stocks such as gas oil. Although FCC is a large and complex process involving many factors, a general outline of the technology is presented here in the context of its relation to the present invention.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, the catalyst tends to accumulate coke thereon, which is burned off in the regenerator.

The heat of combustion in the regenerator typically produces flue gas at temperatures of 718° to 760° C. (1325° to 1400° F.) and at a pressure range of 138 to 276 kPa (20 to 40 psig). Although the pressure is relatively low, the extremely high temperature, high volume of flue gas from the regenerator contains sufficient kinetic energy to warrant economic recovery. To recover energy from a flue gas stream, flue gas may be fed and directed into the blades of a power recovery expander turbine. The kinetic energy of the flue gas is transferred through the blades of the expander to a rotor coupled either to a regenerator air blower, to produce combustion air for the regenerator, and/or to a generator to produce electrical power. Because of the pressure drop of 138 to 207 kPa (20 to 30 psi) across the expander turbine, the flue gas discharges with a temperature drop of approximately 125° to 167° C. (225 to 300° F.). The flue gas may be run to a steam generator for further recovery.

The power recovery train may include an expander turbine, a generator, an air blower, a gear reducer, and a let-down steam turbine. The expander turbine may be coupled to a main air blower shaft to power the air blower of a regenerator of the FCC unit. The expander turbine is a single stage machine. The gas to the expander turbine is accelerated over a parabolic nose cone. The pressure energy is converted to kinetic energy as the flue gas passes through the blades of the turbine. The blades of the expander turbine rotate at very high velocities necessitating measures to protect the blades from physical damage.

A major distinguishing feature of an FCC process is the continuous fluidization and circulation of large amounts of catalyst having an average particle diameter of about 50 to 100 microns, equivalent in size and appearance to very fine sand. For every ton of cracked product made, approximately 5 tons of catalyst are needed, hence the considerable circulation requirements. Coupled with this need for a large inventory and recycle of catalyst with small particle diameters is the ongoing challenge to prevent this catalyst from exiting the reactor/regenerator system into effluent streams.

Catalyst particles can cause erosion of expander turbine blades resulting in loss of power recovery efficiency. Moreover, even though catalyst fines; i.e., particles less than 10 µm in dimension, do not erode expander turbine blades as significantly, they still accumulate on the blades and casing. Blade accumulation can cause blade tip erosion and casing accumulation can increase the likelihood of the tip of the blade rubbing against the casing of the expander turbine which can result in high expander shaft vibration.

Overall, the use of cyclone separators internal to both the reactor and regenerator has provided over 99% separation efficiency of solid catalyst. Typically, the regenerator includes first and second (or primary and secondary) stage separators for the purpose of preventing catalyst contamination of the regenerator flue gas, which is essentially the resulting combustion product of catalyst coke in air. While normally sized catalyst particles are effectively removed in the internal regenerator cyclones, fines material (generally catalyst fragments smaller than about 50 microns resulting from attrition and erosion in the harsh, abrasive reactor/regenerator environment) is substantially more difficult to separate. As a result, the FCC flue gas will usually contain a particulate concentration in the range of about 200 to 1000 mg/Nm$^3$. This solids level can present difficulties related to the applicable legal emissions standards and are still high enough to risk damage to the power recovery expander turbine.

A further reduction in FCC flue gas fines loading is therefore often warranted, and may be obtained from a third stage separator (TSS). The term "third" in TSS typically presumes a first stage cyclone and a second stage cyclone are used for gas-solid separation upstream of the inlet to the TSS. These cyclones are typically located in the catalyst regeneration vessel. More or less separator devices may be used upstream of the TSS. Hence, the term TSS does not require that no more nor less than two separator devices are upstream of the TSS vessel, herein. The TSS induces centripetal acceleration to a particle-laden gas, stream to force the higher-density solids to the outer edges of a spinning vortex. To be efficient, a cyclone separator for an FCC flue gas effluent will normally contain many, perhaps 100, small individual cylindrical cyclone bodies installed within a single vessel acting as a manifold. At least one tube sheet affixing the upper and/or lower ends of the cyclones act to distribute contaminated gas to the cyclone inlets and also to divide the region within the vessel into sections for collecting the separated gas and solid phases.

Proper design of the gas delivery equipment is essential to protecting the power recovery system, particularly the blades of the expander. Cold wall piping comprises a refractory lining on the inside of a metal pipe to insulate the pipe from the hot gas carried therein to minimize thermal expansion. Cold wall piping is not typically specified between the TSS vessel and the expander turbine inlet due to concerns of spalling refractory lining entering the expander turbine and damaging the blades. Hot wall piping, which may be made of stainless steel, without refractory lining thermally expands over five times as much as cold wall piping. The large thermal expansion associated with hot wall piping systems results in significantly higher piping loads that must be accommodated in the design of the piping components and equipment. Invariably, this leads to added cost for support and installation. Additionally, the rotor of the turbo expander turbine may not be allowed to exceed a maximum velocity or the blades could detach from the rotor.

TSS vessels typically only have one main clean gas outlet in communication with the multiple main clean gas outlets of respective cyclones in the TSS vessel as shown in U.S. Pat. No. 5,690,709 and U.S. Pat. No. 5,779,746. GB 2 077 631A shows two clean gas outlets in the top hemispherical head of the TSS vessel. This reference discloses that the clean gas outlets may be connected to a power recovery turbine.

SUMMARY OF THE INVENTION

The power recovery unit, which is usually an expander turbine, for recovering energy from a hot, pressurized gas stream provides extra power to other equipment when needed such as an air blower shaft or an electrical generator, or both. If the power recovery unit produces more energy than is required by the other equipment, the machine may act as a generator and feed power into the refinery power grid. Feeding power into the refinery power grid acts as a braking mechanism and provides some over-speed protection. Given an electrical breaker disconnect from the power grid, a fast acting over-speed valve and bypass conduit or line around the power recovery unit may be required to rapidly divert flue gas around the expander turbine to limit the rotational velocity of the expander turbine. Additionally, diverting a portion of the flue gas around the expander turbine through the bypass conduit may be necessary to control the pressure in the upstream catalyst regenerator. However, as the bypass valve opens, the flow of hot flue gas would cause the hot wall piping to rapidly heat up and thermally expand. The resultant pipe expansion would impose a great deal of force loading and rotational moment on the expander turbine inlet line. The loading and moment on the expander turbine inlet must be relatively small to ensure that the housing of the expander turbine does not deform which could promote the blades to brush with the inner surface of the casing. Additional equipment, engineering design and construction installation labor, would be required to ensure that expansion of the bypass conduit does not translate to a load on the expander turbine inlet line that is in excess of the nozzle loading limits.

The present invention is a system for separating particulate solids from a contaminated gas stream and recovering energy from the contaminated gas stream, typically a hot flue gas stream from a catalyst regeneration vessel. A TSS vessel has a main inlet for receiving gas laden with solids. A plurality of cyclones in the TSS vessel separates the solids from the gas. A solids outlet from the TSS vessel dispenses solids from the TSS vessel and two main clean gas outlets remove clean gas from the TSS vessel. A TSS vessel may have a tube sheet that separates the inlet to the TSS vessel from the outlet from the TSS vessel. In an embodiment, the two main clean gas outlets extend from the TSS vessel below the tube sheet. A first main clean gas outlet from the TSS vessel delivers clean gas to a power recovery unit. A second main clean gas outlet from the TSS vessel is transported through a bypass conduit that bypasses the power recovery unit and mixes with the effluent clean gas from the power recovery unit.

If the actual flowing volume of the clean gas in the main clean gas conduit exceeds a level at which the power recovery unit is rated, a valve in the bypass clean gas conduit is opened to a proportional degree, so a portion of the clean gas being directed to the power recovery unit can be re-directed to bypass the power recovery unit, and maintain proper pressure control of the FCC regenerator and avoid mechanical damage to the power recovery expander. The bypass clean gas conduit is anchored on the TSS vessel instead of on the main clean gas conduit to the power recovery unit, so sudden exposure of the bypass clean gas conduit to hot gases and its concomitant rapid thermal expansion will not suddenly impose a load or moment on the power recovery unit beyond allowance. Hence, equipment, engineering, and installation labor necessary for neutralizing such effects are not necessary. Moreover, because the bypass clean gas conduit does not join with a conduit to the power recovery unit, the bypass clean gas conduit may be lined with insulating refractory to minimize thermal expansion thereof without fear that spalling refractory will damage the power recovery unit.

Accordingly, an object of the present invention is to provide a TSS vessel with a first main clean gas outlet that feeds a power recovery unit and a second main clean gas outlet that feeds a bypass conduit that bypasses the power recovery unit.

DETAILED DESCRIPTION OF THE INVENTION

The present invention applies to the purification of a broad range of solid-contaminated gas streams, and especially those containing dust particles in the 1 to 20 µm range. A number of commercial gas purification operations meet this description, including the treatment of effluent streams of solid catalyst fluidized bed processes, coal fired heaters, and power plants. Several well-known refinery operations rely on fluidized bed technology, such as a preferred embodiment of the process for converting methanol to light olefins, as described in U.S. Pat. No. 6,137,022, using a solid catalyst composition. Another area of particular interest lies in the purification of FCC effluent streams that contain entrained catalyst particles resulting from attrition, erosion, and/or abrasion under process conditions within the reactor.

Figure 1:
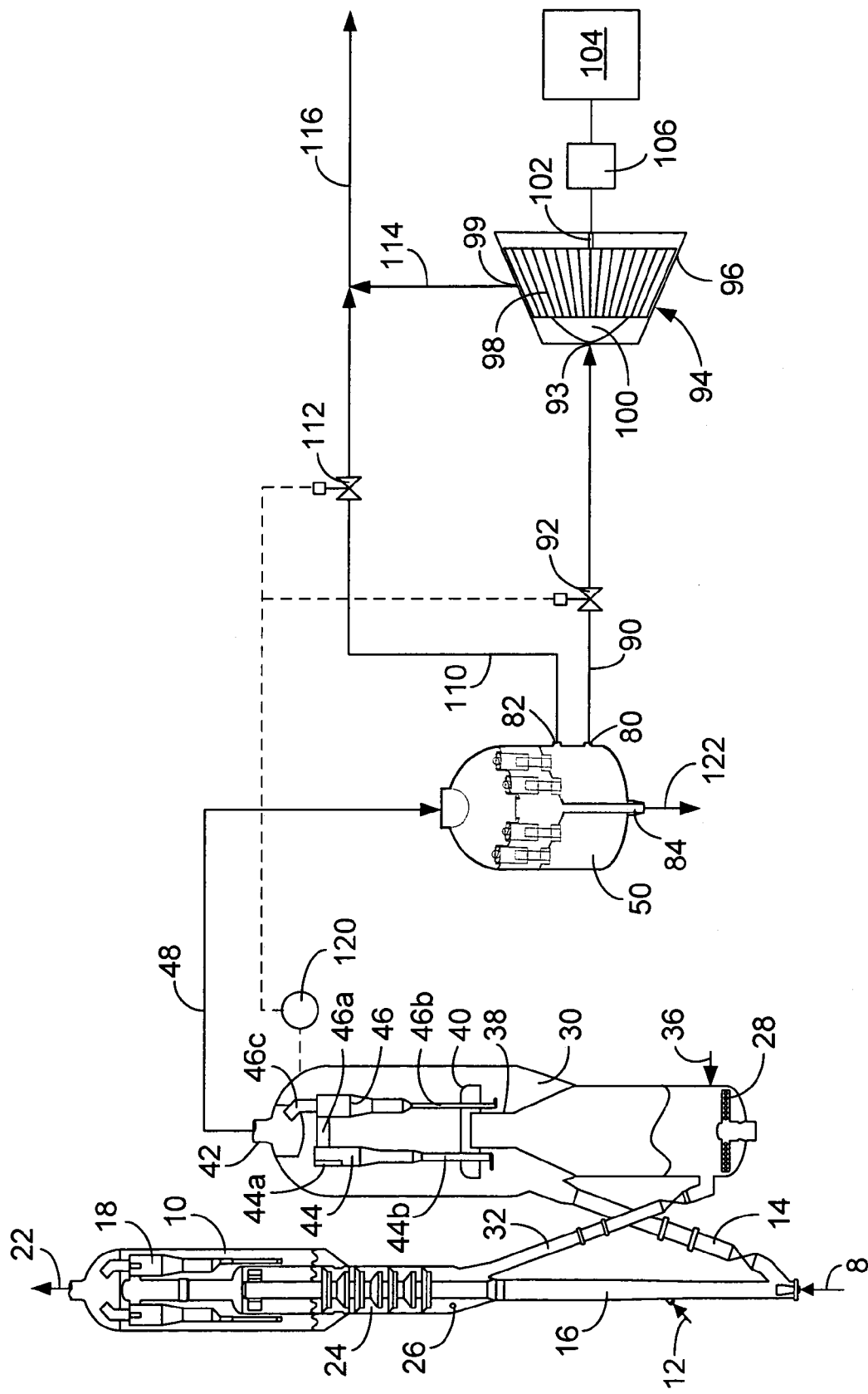
FIG. 1 is a schematic view of the system of the present invention.

As mentioned, fluid catalytic cracking (FCC) is a well-known oil refinery operation relied upon in most cases for gasoline production. Process variables typically include a cracking reaction temperature of 400° to 600° C. and a catalyst regeneration temperature of 500° to 900° C. Both the cracking and regeneration occur at an absolute pressure below 5 atmospheres. FIG. 1 shows a typical FCC process unit of the prior art, where a heavy hydrocarbon feed or raw oil in a line 12 is contacted with a newly regenerated catalyst entering from a regenerated catalyst standpipe 14. This contacting may occur in a narrow reactor conduit 16, known as a reactor riser, extending upwardly to the bottom of a reactor vessel 10. The contacting of feed and catalyst is fluidized by gas from a fluidizing line 8. Heat from the catalyst vaporizes the oil, and the oil is thereafter cracked in the presence of the catalyst as both are transferred up the reactor conduit 16 into the reactor vessel 10 itself, operating at a pressure somewhat lower than that of the reactor conduit 16. The cracked light hydrocarbon products are thereafter separated from the catalyst using a first stage internal reactor cyclone 18 and a second stage internal reactor cyclone (not shown) and exit the reactor vessel 10 through a line 22 to subsequent fractionation operations. More or less cyclones may be used in the reactor vessel 10. At this point, some inevitable side reactions occurring in the reactor conduit 16 have left detrimental coke deposits on the catalyst that lower catalyst activity. The catalyst is therefore referred to as being spent (or at least partially spent) and requires regeneration for further use. Spent catalyst, after separation from the hydrocarbon product, falls into a stripping section 24 where steam is injected through a nozzle 26 to purge any residual hydrocarbon vapor. After the stripping operation, the spent catalyst is fed to a catalyst regeneration vessel 30 through a spent catalyst standpipe 32.

FIG. 1 depicts a regeneration vessel 30 known as a combustor. However, other types of regeneration vessels are suitable. In the catalyst regeneration vessel 30, a stream of air is introduced through an air distributor 28 to contact the spent catalyst, burn coke deposited thereon, and provide regenerated catalyst. The catalyst regeneration process adds a substantial amount of heat to the catalyst, providing energy to offset the endothermic cracking reactions occurring in the reactor conduit 16. Some fresh catalyst is added in a line 36 to the base of the catalyst regeneration vessel 30 to replenish catalyst exiting the reactor vessel 10 as fines material or entrained particles. Catalyst and air flow upward together along a combustor riser 38 located within the catalyst regeneration vessel 30 and, after regeneration (i.e. coke burn), are initially separated by discharge through a disengager 40, also within the catalyst regeneration vessel 30. Finer separation of the regenerated catalyst and flue gas exiting the disengager 40 is achieved using a first stage separator cyclone 44 and a second stage separator cyclone 46 within the catalyst regeneration vessel 30. More or less separator cyclones may be used in the regeneration vessel 30. Flue gas enters the first stage separator cyclone 44 through an inlet 44*a*. Catalyst separated from flue gas dispenses through a dipleg 44*b* while flue gas relatively lighter in catalyst travels through a conduit 46*a* into the second stage separator cyclone 46. Additional catalyst separated from the flue gas in the second stage separator cyclone 46 is dispensed into the catalyst regeneration vessel 30 through a dipleg 46*b* while flue gas relatively even lighter in solids exits the second stage separator cyclone 46 through an outlet tube 46*c*. Regenerated catalyst is recycled back to the reactor vessel 10 through the regenerated catalyst standpipe 14. As a result of the coke burning, the flue gas vapors exiting at the top of the catalyst regeneration vessel 30 in a nozzle 42 contain CO, $CO_2$ and $H_2O$, along with smaller amounts of other species. While the first stage separator cyclone 44 and the second stage separator cyclone 46 can remove the vast majority of the regenerated catalyst from the flue gas in the nozzle 42, fine catalyst particles, resulting mostly from attrition, invariably contaminate this effluent stream. The fines-contaminated flue gas therefore typically contains about 200 to 1000 mg/$Nm^3$ of particulates, most of which are less than 50 microns in diameter. In view of this contamination level, and considering both environmental regulations as well as the option to recover power from the flue gas, the incentive to further purify the relatively contaminated flue gas using a TSS vessel is significant. A conduit 48 delivers the contaminated flue gas to a TSS vessel 50.

Figure 2:
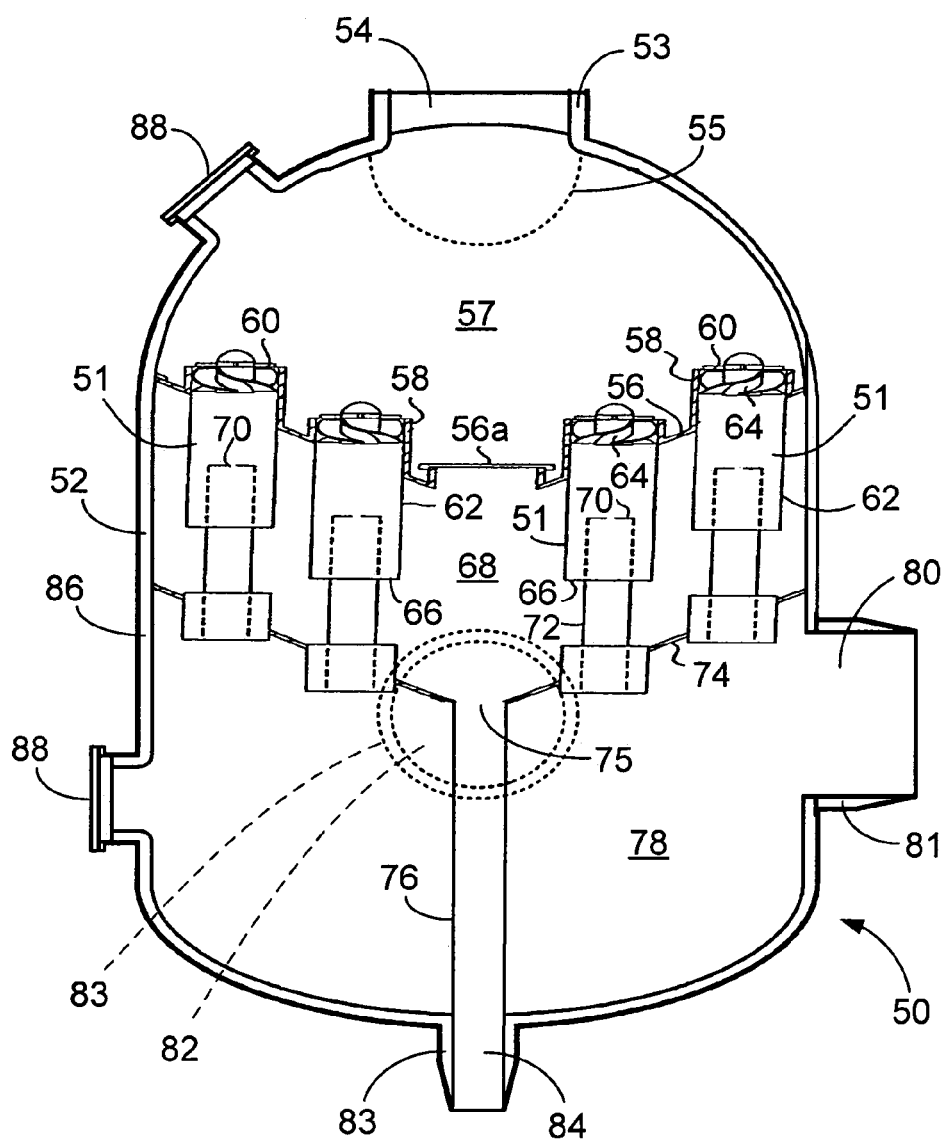
FIG. 2 is a schematic view of a TSS vessel of the present invention.

The TSS vessel 50, containing numerous individual cyclones 51, that may be used in the present invention is shown in FIG. 2. Although only four cyclones 51 are shown in FIG. 2, at least 10 and as many as 200 cyclones 51 are anticipated for variously sized units. The cyclones 51 and the TSS vessel 50 need not include all the details disclosed herein to utilize the present invention. The TSS vessel 50 is normally lined with a refractory material 52 to reduce erosion of the metal surfaces by the entrained catalyst particles. The fines-contaminated flue gas from the catalyst regeneration vessel 30 enters the top of the TSS vessel 50 at a main contaminated gas inlet 54 through a nozzle 53. The main contaminated gas inlet 54 is above an upper tube sheet 56 that retains top ends 58 of each cylindrical cyclone body 62. In an embodiment, the upper tube sheet 56 at least in part defines an inlet chamber 57, limits communication between the inlet chamber 57 and the rest of the TSS vessel 50 and/or extends the entire cross-section of the TSS vessel 50; A cover 56*a* of an optional manway provides access through the upper tube sheet 56 and assists in the aforementioned functions. An optional diffuser 55 may spread out the flow of contaminated flue gas into the TSS vessel 50. The contaminated gas stream is then distributed among cyclone contaminated gas inlets 60 and encounters one or more swirl vanes 64 proximate the inlets 60 to induce centripetal acceleration of the particle-contaminated gas. The swirl vanes 64 are structures within the cylindrical cyclone body 62 that have the characteristic of restricting the passageway through which incoming gas can flow, thereby accelerating the flowing gas stream. The swirl vanes 64 also change the direction of the contaminated gas stream to provide a helical or spiral formation of gas flow through the length of the cylindrical cyclone body 62. This spinning motion imparted to the gas sends the higher-density solid phase toward the wall of the cylindrical cyclone body 62. The cyclones 51, in an embodiment, include a closed bottom end 66 of the cylindrical cyclone body 62. In an embodiment, slots in the cylindrical cyclone body 62 allow solid particles that have been thrown near the wall of the cylindrical cyclone body 62 to fall into a solids chamber 68 between the upper tube sheet 56 and a lower tube sheet 74. The upper tube sheet 56 and the lower tube sheet 74 limit communication between the solids chamber 68 and the rest of the TSS vessel 50. In an embodiment, the upper tube sheet 56 and the lower tube sheet 74 define at least in part the solids chamber 68. The lower tube sheet 74 may extend the entire cross-section of the interior of the TSS vessel 50. However, a solids outlet tube 76 allows solids to pass from the solids chamber 68. In an embodiment, the solids outlet tube 76 extends from the TSS vessel 50 through an outlet 84 defined by a nozzle 83. In an embodiment, the upper tube sheet 56 and/or the lower tube sheet 74 define an inverted cone to facilitate the exit of solids from the downward vertex of the conical lower tube sheet 74 at an inlet 75 to the solids outlet tube 76. Clean gas, flowing along the centerline of the cylindrical cyclone body 62, passes through an inlet 70 of a cyclone gas outlet tube 72. The clean gas is then discharged via the cyclone gas outlet tube 72 below the lower tube sheet 74 into a clean gas chamber 78. In an embodiment, the lower tube sheet 74 at least in part defines the clean gas chamber 78 and limits communication between the clean gas chamber 78 and the rest of the TSS vessel 50 and particularly the solids chamber 68. The combined clean gas stream, representing the bulk of the flue gas fed to the TSS vessel 50, then exits through one of a first main clean gas outlet 80 and a second main clean gas outlet 82 (shown in phantom in FIG. 2) near the bottom of the TSS vessel 50. Both main clean gas outlets 80, 82 may be defined by a first clean gas outlet nozzle 81 and a second clean gas outlet nozzle 83, respectively. The first and second main clean gas outlets 80, 82 communicate only with the clean gas chamber 78. In an embodiment, the first and second main clean gas outlets 80, 82 are below the upper and lower tube sheets 56, 74 and particularly below the lower tube sheet 74. The first and second main clean gas outlet nozzles 81, 83 may extend from a vertical wall 86 of the TSS vessel 50. Manways 88 to the TSS vessel 50 are covered during operation and allow access during maintenance and construction. Separated particles and a minor amount (typically less than 10 wt-% of the contaminated flue gas) of underflow gas are removed through a separate solids outlet 84 at the bottom of the TSS vessel 50. A trash screen or grating (not shown) may be installed in the main clean gas outlets 80, 82 to block passage of spalling refractors.

Turning back to FIG. 1, the clean gas exiting the first main clean gas outlet 80 travels in a power recovery inlet line 90 or conduit through a control valve 92 to a power recovery unit 94 through a power recovery inlet 93. Clean gas outlets 80, 82 are shown schematically different in FIG. 1 than in FIG. 2 for purposes of illustration. The power recovery inlet line 90 is devoid of refractory lining. In an embodiment, the power recovery unit 94 is an expander turbine. A typical expander turbine has an outer casing 96 and a plurality of blades 98 fastened to a rotor (not shown). As the hot flue gas enters the power recovery unit 94 and accelerates over a parabolic nose cone 100, the high velocity pressurized flue gas propels the blades 98 to turn at high velocity, turning a shaft 102. The shaft 102 may be linked to a generator 104 through a gear box 106. The flue gas exits the power recovery unit 94 through a power recovery outlet 99. Although not shown, the shaft 102 may alternatively or additionally be connected to the main air blower that pumps air into the catalyst regeneration vessel 30 or other equipment on site. Power generated by the power recovery unit 94 in excess of that required to power the main air blower or other equipment is translated into electricity that feeds the power grid for the facility for which the TSS is a component or may be fed to another power grid. Although the power required to operate the main air blower or other equipment and to generate electricity in the generator 104 serves to resist excessive rotational speed of the blades 98, other precautions must be taken to ensure proper pressure control of the catalyst regeneration vessel 30 and ensure that the expander blades 98 do not exceed a maximum speed which would cause damage to the power recovery unit 94. Therefore, the second main clean gas outlet 82 feeds a bypass conduit 110 or line. The bypass conduit 110 passes through a control valve 112 and joins from a power recovery outlet conduit 114 or line passing from the power recovery outlet 99. A combined flue gas outlet line 116 carries the gas in the lines 110, 114 to the atmosphere or to further processing. The clean gas effluent from the TSS vessel 50 captures nearly 100% of particles having a dimension of greater than 10 microns and has an overall concentration of solids that meets the most stringent environmental protection regulations in the United States and internationally. A pressure indicator controller (PIC) 120 is linked to the control valves 92 on the power recovery inlet line 90 and the control valve 112 on the bypass conduit 110. The PIC 120 will signal the control valve 92 first to control the pressure in the catalyst regeneration vessel 30 while the control valve 112 in the bypass conduit 1110 will be closed. However, if the control valve 92 is fully open to reduce the pressure in the catalyst regeneration vessel 30, the control valve 112 in the bypass conduit 110 can be opened in an appropriate amount from the signal from the PIC 120 to ensure that the kinetic energy in the power recovery inlet line 90 will not cause the power recovery unit 94 to exceed its allowance rating.

The solids retrieved from the TSS vessel 50 in the solids outlet 84 can be optionally taken by a line 122 to a fourth stage separator (not shown) to further remove underflow gas from catalyst and collect the catalyst in a spent catalyst hopper and/or the underflow gas may be delivered to other types of additional processing.

The configuration of the present invention permits the bypass conduit 110 to be a refractory lined, cold wall line connected directly at an inlet end to the second main clean gas outlet 82 on the TSS vessel 50. The piping design from the fixed foundation TSS vessel 50 to the inlet 93 of the power recovery unit 94 becomes a very elegant design. The transient loads applied to the inlet to the power recovery unit 94 associated with intermittently bypassing hot flue gas to the bypass conduit 110 are eliminated. The bypass conduit 110 becomes a much shorter, cold wall design, lowering the overall capital cost. The first main clean gas outlet 80 is in upstream fluid communication with the power recovery inlet 93 to the power recovery unit 94 through the power recovery inlet line 90 and the control valve 92. The second main clean gas out 82 is not in downstream communication with the power recovery unit 94 but in upstream fluid communication with the power recovery outlet conduit 114. The power recovery inlet 93 is in downstream fluid communication with the first main clean gas outlet 80 via the power recovery inlet line 90 and the control valve 92, and the power recovery outlet 99 is in downstream fluid communication with the second main clean gas outlet 82 via the bypass conduit 110, the control valve 112 and the power recovery outlet conduit 114. In other words, the power recovery inlet 93 receives at least a portion of the clean gas effluent from the first main clean gas outlet 80, but none of the clean gas effluent from the second main clean gas outlet 82. Moreover, the flue gas outlet line 116 receives clean gas effluent from the second main clean gas outlet 82 and clean gas effluent from the first main clean gas outlet 80 via power recovery outlet 99. The bypass conduit 110 and the power recovery outlet conduit 114 join together to deliver the two effluents to the flue gas outlet line 116.

Figure 3:
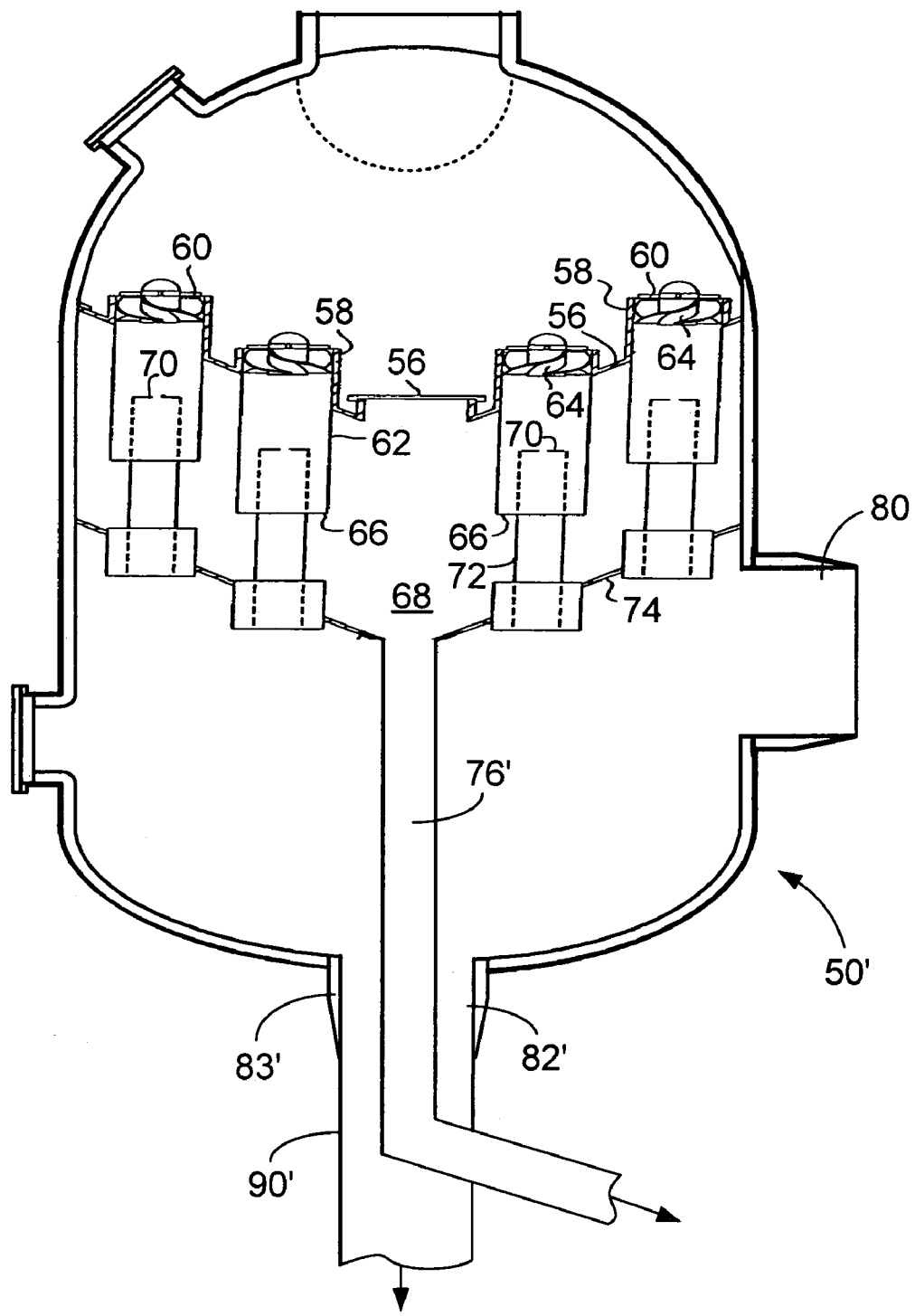
FIG. 3 is a schematic view of an alternative embodiment of a TSS vessel of FIG. 2.

FIG. 3 shows a TSS vessel 50' as shown in FIG. 2 but with a different main clean gas outlet and solids outlet configuration. All the reference numerals in FIG. 3 will be the same as in FIG. 2 unless the element designated by the reference numeral in FIG. 3 is configured differently than in FIG. 2. FIG. 3 shows a second main clean gas outlet 82' that extends from the bottom of the TSS vessel 50' instead of the second main clean gas outlet 82 shown in phantom in FIG. 2 in the vertical wall 86 of the TSS vessel 50. A solids outlet tube 76' extending from the lower tube sheet 74 extends through the second main clean gas outlet 82' defined by a nozzle 83' and then diverges from a power recovery inlet line 90'. This configuration provides flexibility for incorporating the TSS vessel 50' into a particular flow scheme. The second main clean gas outlet 82' at the bottom of the TSS vessel 50' may be in upstream fluid communication either with the bypass conduit 110 or the power recovery inlet line 90'. Additionally, the configuration in FIG. 3 may be used when only one main clean gas outlet 82' extends from the TSS vessel 50' which may omit the first main clean gas outlet 80 shown in FIG. 3.

Although it is not shown in the drawings, it is also contemplated that both main clean gas outlets may extend through or be contained in the same nozzle of the TSS vessel.

What is claimed is:

1. A system for separating particulate solids from a contaminated gas stream, said system comprising:
 a separator vessel having a main contaminated gas inlet, a solids outlet and a first main clean gas outlet and a second main clean gas outlet; and a power recovery unit having a unit inlet and a unit outlet, said unit inlet being in downstream communication with said first main clean gas outlet and said unit outlet being in downstream communication with said second main clean gas outlet.

2. The system of claim 1 wherein said main contaminated gas inlet is in communication with a catalyst regeneration vessel.

3. The system of claim 2 wherein said catalyst regeneration vessel has two cyclones in series in communication with said main contaminated gas inlet.

4. The system of claim 1 wherein a bypass conduit communicates said second main clean gas outlet with said unit outlet and said bypass conduit has an inner wall with a refractory lining.

5. The system of claim 1 wherein the solids outlet and the first main clean gas outlet or the second main clean gas outlet extend through the same nozzle of the separator vessel.

6. A system for separating particulate solids from a contaminated gas stream, said system comprising:
a vessel including:
a main contaminated gas inlet to said vessel;
a plurality of cyclones, each cyclone including a cyclone contaminated gas inlet in communication with said main contaminated gas inlet, a cyclone clean gas outlet and a cyclone solids outlet;
a tube sheet within said vessel surrounding at least some of said plurality of cyclones;
a main solids outlet extending from said vessel, said main solids outlet being in communication with said cyclone solids outlet; and
a first main clean gas outlet and a second main clean gas outlet defined by said vessel, said first main clean gas outlet being in communication with an inlet to a power recovery device and said second main clean gas outlet being out of communication with said power recovery device.

7. The system of claim 6 including an additional tube sheet.

8. The system of claim 7 wherein said cyclones comprise a body having a closed bottom end and a top end, the body defining said cyclone contaminated gas inlet at said top end, the feed gas inlet extending above the tube sheet, the cyclone body further defining a sidewall with discharge openings located between the tube sheet and the additional tube sheet for discharging particulate solids and a minor amount of an underflow gas stream.

9. The system of claim 8 further including a swirl vane to induce centripetal acceleration of the contaminated gas stream.

10. The system of claim 8 further including a cyclone gas outlet tube defining a clean gas inlet end located within the cyclone body for receiving a clean gas stream and further defining a cyclone clean gas outlet extending through the closed bottom end of the cyclone body and the additional tube sheet.

11. The system of claim 6 wherein at least one of said first and second main clean gas outlets are defined by said vessel below said tube sheet.

12. The system of claim 6 wherein the solids outlet and the first main clean gas outlet or the second main clean gas outlet are disposed in the same nozzle of the separator vessel.

13. A system for separating particulate solids from a contaminated gas stream, said system comprising:
a vessel including a main contaminated gas inlet to said vessel, a plurality of cyclones, each cyclone including a cyclone contaminated gas inlet in communication with said main contaminated gas inlet, a cyclone clean gas outlet and a cyclone solids outlet, a tube sheet within said vessel surrounding at least some of said plurality of cyclones, a main solids outlet from said vessel, said main solids outlet being in communication with said cyclone solids outlet, and a first main clean gas outlet and a second main clean gas outlet from said vessel;
a power recovery device in communication with said first main clean gas outlet; and
a bypass conduit in communication with said second main clean gas outlet that bypasses said power recovery device.

14. The system of claim 13 wherein said bypass conduit in communication with said second main clean gas outlet includes a refractory lining on an inner wall thereof.

15. The system of claim 13 wherein an outlet conduit from said power recovery device is in communication with said bypass conduit.

16. The system of claim 13 wherein said main contaminated gas inlet is in communication with a flue gas outlet of a catalyst regeneration vessel.

17. The system of claim 13 wherein said catalyst regeneration vessel has two cyclones in series in communication with said main contaminated gas inlet.

18. A process for separating particulate solids from a contaminated gas stream and recovering power from said contaminated gas stream comprising:
delivering said contaminated gas stream to a separator vessel;
separating particulate solids from said contaminated gas stream in said separator vessel;
withdrawing particulate solids from said separator vessel;
transporting a first clean gas stream from a first main clean gas outlet of said separator vessel to a power recovery unit;
recovering mechanical power from said first clean gas stream in said power recovery unit;
withdrawing said first clean gas stream from said power recovery unit; and
intermittently mixing a second clean gas stream from a second main clean gas outlet of said separator vessel with said first clean gas stream withdrawn from said power recovery unit.

19. The process of claim 18 wherein said contaminated gas stream is obtained from a catalyst regeneration vessel.

* * * * *